United States Patent [19]

Wolff et al.

[11] Patent Number: 5,137,927
[45] Date of Patent: Aug. 11, 1992

[54] COMPOSITE FOAMS OF LOW THERMAL CONDUCTIVITY

[75] Inventors: Bernardo Wolff, Mannheim; Frieder Hohwiller, Bad Duerkheim; Guenther Seybold, Neuhofen, all of Fed. Rep. of Germany

[73] Assignee: BASF Aktiengesellschaft, Ludwigshafen, Fed. Rep. of Germany

[21] Appl. No.: 825,356

[22] Filed: Jan. 24, 1992

Related U.S. Application Data

[62] Division of Ser. No. 801,289, Dec. 2, 1991.

[30] Foreign Application Priority Data

Dec. 5, 1990 [DE] Fed. Rep. of Germany ....... 4038784

[51] Int. Cl.$^5$ .............................................. C08J 9/232
[52] U.S. Cl. ....................................... 521/54; 521/56; 521/51; 521/60; 521/91
[58] Field of Search ........................ 521/54, 57, 56, 60, 521/91

[56] References Cited

U.S. PATENT DOCUMENTS

| | | | |
|---|---|---|---|
| 2,861,898 | 11/1958 | Platzer | 521/57 |
| 3,304,274 | 2/1967 | Eng | 521/57 |
| 3,661,810 | 5/1972 | Gahmig | 521/57 |
| 4,198,485 | 4/1980 | Stark, Jr. | 521/57 |
| 4,446,208 | 5/1984 | Schwarz | 521/57 |
| 4,448,900 | 5/1984 | Schwarz | 521/57 |

Primary Examiner—Morton Foelak
Attorney, Agent, or Firm—Keil & Weinkauf

[57] ABSTRACT

A composite foam of low thermal conductivity comprises
a) 20–80% by volume of silica aerogel particles having a mean diameter of from 0.1 to 20 mm and a density of from 0.08 to 0.40 g/cm$^3$,
b) 20–80% by volume of a styrene polymer foam which surrounds the particles of component a) and binds them to one another and has a density of from 0.01 to 0.15 g/cm$^3$, and, if desired,
c) conventional additives in effective amounts.

2 Claims, No Drawings

COMPOSITE FOAMS OF LOW THERMAL CONDUCTIVITY

This is a divisional of application Ser. No. 801,289, filed Dec. 2, 1991.

The present invention relates to novel composite foams which comprise silica aerogel particles and styrene polymer foams and are distinguished by low thermal conductivity.

Conventional insulating materials based on polyolefins and polyurehtanes are generally produced using organic blowing agents, such as chlorofluorocarbons. The blowing agent included in the cells of the foam is responsible for the high thermal insulation capacity. Blowing agents of this type are environmental pollutants since they slowly escape into the atmosphere.

It is furthermore known that silica aerogels have an excellent thermal insulation capacity. However, the product cannot be produced in any desired shape. It furthermore has only low compressive strength and is susceptible to fracturing. In addition, a loose aerogel pile tends to shrink somewhat in volume due to gradual post-compression.

EP-A 340 707 proposes binding silica aerogel particles to form compression-resistant insulating materials by means of an inorganic or organic binder. However, the thermal conductivity of these products is unsatisfactory.

It is an object of the present invention to develop insulating materials having a high thermal insulation capacity which are free from environmentally unacceptable organic blowing agents.

It is a further object of the present invention, in particular, to produce insulating materials of any desired shape starting from silica aerogel and at the same time to compensate for the low compressive strength and high susceptibility toward fracture of the aerogel and the shrinkage in volume of an aerogel pile by binding this substance into a matrix, while retaining the low thermal conductivity.

We have found that this object is achieved by a composite foam comprising silica aerogel particles and styrene polymer foams.

The invention accordingly provides a composite foam of low thermal conductivity, comprising
a) 20–80% by volume of silica aerogel particles having a mean diameter of from 0.1 to 20 mm and a density of from 0.08 to 0.40 g/cm$^3$,
b) 20–80% by volume of a styrene polymer foam which surrounds the particles of component a) and binds them to one another and has a density of from 0.01 to 0.15 g/cm$^3$, and, if desired,
c) conventional additives in effective amounts.

The present invention furthermore provides a process for the production of composite foams of this type which comprises heating an intimate mixture of silica aerogel particles and styrene polymer foam particles to a temperature above the softening point of the styrene polymer in a mold which does not seal in a gas-tight manner.

The essential constituent of the novel composite foam comprises silica aerogel gel particles which have a mean diameter of from 0.1 to 20 mm, preferably from 0.5 to 5 mm, in particular from 1 to 4 mm.

The silica aerogel particles are generally in the form of beads or spheres and have a density of from 0.05 to 0.40 g/cm$^3$, preferably from 0.08 to 0.35 g/cm$^3$, and a bulk density of from 0.04 to 0.25 g/cm$^3$. Their thermal conductivity λ is from 0.020 to 0.025 [W/m.K].

The silica aerogel particles essentially comprise amorphous $SiO_2$ and contain traces of water and possibly small amounts of organic compounds (up to 10%), depending on the way in which they are produced. They are produced in a conventional manner from a water-glass solution via a silica hydrogel by solvent exchange and subsequent drying. The bead form is produced by spraying a rapidly gelling silicic acid sol from a specially designed nozzle and gelling the drops in the air. Further details on this process are given in DT-A 21 03 243. Replacement of the hydrogel water by other liquids which are chemically inert toward $SiO_2$ is described, for example, in U.S. Pat. Nos. 2,093,454, 3,977,993 and JA-A 53/025,295, and the drying of the lyogels is described, for example, in U.S. Pat. Nos. 2,093,454, 2,249,767, FR-A 130 417, U.S. Pat. No. 3,672,833, EP-A 0 018 955, U.S. Pat. No. 4,327,065, EP-A 0 067 741, DE-A 34 29 671, EP-A 0 186 149 and U.S. Pat. No. 4,610,863. The gel liquid used for supercritical drying is advantageously dry methanol, which means that the resultant aerogels are hydrophobic with an organic carbon content of about 5%.

In the novel composite foams, the silica aerogel particles are bound to one another by a styrene polymer foam which has a density of from 0.01 to 0.15 g/cm$^3$, preferably from 0.015 to 0.09 g/cm$^3$, in particular from 0.02 to 0.07 g/cm$^3$.

For the purposes of the present invention, styrene polymers are polystyrene and copolymers of styrene which contain at least 50% by weight, preferably at least 80% by weight, of copolymerized styrene. Examples of suitable comonomers are α-methylstyrene, ring-halogenated styrenes, ring-alkylated styrenes, acrylonitrile, esters of (meth)acrylic acid with alcohols having from 1 to 8 carbon atoms, N-vinyl compounds, such as vinylcarbazole, maleic anhydride or alternatively small amounts of compounds which contain two polymerizable double bonds, such as butadiene, divinylbenzene or butanediol diacrylate.

The novel composite foams may furthermore contain conventional additives in effective amounts, such as dyes, pigments, fillers, flameproofing agents, synergists for flameproofing agents, antistatics, stabilizers, lubricants, opacifiers and the like. The additives may be both in the aerogel phase and in the foam phase.

The composite foams are expediently produced by heating an intimate mixture of silica aerogel particles and styrene polymer foam particles to a temperature above the softening point of the styrene polymer in a mold which does not seal in a gas-tight manner. Foam particles having a particle diameter of form 0.2 to 5 mm, advantageously from 0.25 to 4 mm, in particular from 0.3 to 3 mm, are advantageously used. A particularly high molding quality and good welding is achieved if at least some of the foam particles are smaller than the interconnecting cavities of the aerogel particle material.

On heating, advantageously by means of steam or hot air, the styrene polymer softens, the foam particles expand, and the pressure this causes substantially fills the interconnecting cavities with the foam, and the foam surrounds and aerogel particles to foam a strong composite. After cooling, the composite foam molding is removed from the mold and dried if necessary. Moldings, produced in a block mold can be cut into sheets using a suitable cutting device.

EXAMPLES

The amounts by volume shown in the Table of finely divided particles of expanded polystyrene and hydrophobicized silica aerogel particles are mixed intimately and introduced into a mold which does not seal in a gas-tight manner, as is customary for the production of polystyrene foam moldings. The mold is flushed with steam (1 bar, 100° C.) for 15 seconds. After 10 minutes, the molding can be removed and is subsequently dried at 40° C. for 24 hours. The results are shown in the Table.

We claim:
1. A composite foam of low thermal conductivity, comprising
   a) 20–80% by volume of silica aerogel particles having a mean diameter of from 0.1 to 20 mm and a density of from 0.08 to 0.04 g/cm$^3$,
   b) 20–80% by volume of molded polymer foam particles which surrounds the particles of component a) and binds them to one another and has a density of from 0.01 to 0.15 g/cm$^3$.
2. A composite foam as claimed in claim 1, wherein the silica aerogel particles are hydrophobic.

\* \* \* \* \*

|  | Examples | | | | | | | | | |
|---|---|---|---|---|---|---|---|---|---|---|
|  | 1 | 2 | 3 | 4 | 5 | 6 | 7 | 8 | 9 Comp. | 10 Comp. |
| Starting materials | | | | | | | | | | |
| Diameter of EPS particles [mm] | 0.3–2.5 | 0.3–2.5 | 0.3–2.5 | 0.3–2.5 | 0.3–2.5 | 0.3–2.5 | 0.3–2.5 | 0.3–2.5 | — | 0.3–2.5 |
| Bulk density of EPS particles [g/l] | 60 | 32 | 60 | 32 | 60 | 32 | 60 | 32 | — | 32 |
| Diameter of SAG particles [mm] | 2–5 | 2–5 | 2–5 | 2–5 | 2–5 | 2–5 | 2–5 | 2–5 | 2–5 | — |
| Bulk density of SAG particles [g/l] | 135 | 135 | 135 | 135 | 135 | 135 | 135 | 135 | 135 | — |
| Mixing ratio by volume of EPS:SAG particles | 30:70 | 30:70 | 40:60 | 40:60 | 50:50 | 50:50 | 60:40 | 60:40 | 0:100 | 100:0 |
| Composite foam | | | | | | | | | | |
| Density [g/l] | 117 | 101 | 109 | 93 | 101 | 85 | 93 | 74 | — | — |
| Density of EPS [g/l] | 34 | 18 | 40 | 21 | 45 | 24 | 49 | 26 | — | — |
| Density of SAG [g/l] | 200 | 200 | 200 | 200 | 200 | 200 | 200 | 200 | — | — |
| EPS:SAG ratio by volume | 53:47 | 53:47 | 60:40 | 60:40 | 66:34 | 66:34 | 73:27 | 73:27 | — | — |
| Thermal conductivity at 10° C. in accordance with DIN 52 612 [W/mK] | 0.022 | 0.021 | 0.020 | 0.022 | 0.023 | 0.027 | 0.027 | 0.027 | 0.023 | 0.033 |
| Compressive stress in accordance with DIN 53 421 [N/mm$^2$] | 0.303 | 0.085 | 0.375 | 0.129 | 0.412 | 0.159 | 0.458 | 0.159 | — | — |

EPS = expanded polystyrene
SAG = silica aerogel

UNITED STATES PATENT AND TRADEMARK OFFICE
CERTIFICATE OF CORRECTION

PATENT NO. : 5,137,927

DATED : August 11, 1992

INVENTOR(S) : Bernardo WOLFF et al.

It is certified that error appears in the above-identified patent and that said Letters Patent is hereby corrected as shown below:

<u>Claim 1, Column 4, Line 6</u>

"0.04" should read -- 0.40 --.

Signed and Sealed this

Seventh Day of September, 1993

Attest:

BRUCE LEHMAN

*Attesting Officer*    *Commissioner of Patents and Trademarks*